(12) United States Patent
Misra et al.

(10) Patent No.: US 10,565,520 B2
(45) Date of Patent: Feb. 18, 2020

(54) FEATURE EXTRACTION FOR MACHINE LEARNING

(71) Applicant: Accenture Global Solutions Limited, Dublin (IE)

(72) Inventors: Janardan Misra, Bangalore (IN); Shubhashis Sengupta, Bangalore (IN); Sanjay Podder, Thane (IN); Karthik Acharyulu, Madanapalle (IN)

(73) Assignee: Accenture Global Solutions Limited, Dublin (IE)

( * ) Notice: Subject to any disclaimer, the term of this patent is extended or adjusted under 35 U.S.C. 154(b) by 596 days.

(21) Appl. No.: 15/161,867

(22) Filed: May 23, 2016

(65) Prior Publication Data

US 2017/0161637 A1 Jun. 8, 2017

(30) Foreign Application Priority Data

Mar. 12, 2015 (IN) .......................... 6492/CHE/2015

(51) Int. Cl.
*G06F 17/27* (2006.01)
*G06F 17/00* (2019.01)
*G06F 17/30* (2006.01)
*G06F 17/21* (2006.01)
*G06F 3/048* (2013.01)
*G06N 99/00* (2019.01)
(Continued)

(52) U.S. Cl.
CPC ............. *G06N 20/00* (2019.01); *G06F 16/23* (2019.01); *G06F 16/313* (2019.01)

(58) Field of Classification Search
CPC ................ G06N 99/005; G06N 99/00; G06F 17/30345; G06F 17/27; G06F 17/30

USPC .................................................. 706/1–62; 1/1
See application file for complete search history.

(56) References Cited

U.S. PATENT DOCUMENTS 8,161,059 B2 * 4/2012 Guo ........................ G06Q 30/02
707/758
8,321,367 B2 * 11/2012 Nishida .................. G06Q 10/10
382/159

(Continued)

OTHER PUBLICATIONS

Wikipedia, "Feature (machine learning)," https://en.wikipedia.org/wiki/Feature_(machine_learning), Jan. 31, 2016, 2 pages.

*Primary Examiner* — Brandon S Cole
(74) *Attorney, Agent, or Firm* — Harrity & Harrity, LLP

(57) ABSTRACT

A device may receive a first command, included in a set of commands, to set a configuration parameter associated with performing feature extraction. The device may receive a second command, included in the set of commands, to set a corresponding value for the configuration parameter. The configuration parameter and the corresponding value may correspond to a particular feature metric that is to be extracted. The device may configure, based on the configuration parameter and the corresponding value, feature extraction for a corpus of documents. The device may perform, based on configuring feature extraction for the corpus, feature extraction on the corpus to determine the particular feature metric. The device may generate a feature vector based on performing the feature extraction. The feature vector may include the particular feature metric. The feature vector may include a feature identifier identifying the particular feature metric. The device may provide the feature vector.

20 Claims, 6 Drawing Sheets

(51) Int. Cl.
  *G06F 19/00* (2018.01)
  *G06N 20/00* (2019.01)
  *G06F 16/23* (2019.01)
  *G06F 16/31* (2019.01)

(56) References Cited

U.S. PATENT DOCUMENTS

| | | | | |
|---|---|---|---|---|
| 8,346,534 B2* | 1/2013 | Csomai | ............... | G06F 17/2755 704/1 |
| 8,761,498 B1* | 6/2014 | Wu | ............... | G06K 9/00624 382/159 |
| 9,183,454 B1* | 11/2015 | Ames | ............... | G06K 9/4604 |
| 9,245,120 B2* | 1/2016 | Friedrichs | ............... | G06F 21/56 |
| 9,462,313 B1* | 10/2016 | Sbaiz | ............... | H04N 21/25891 |
| 2004/0175687 A1* | 9/2004 | Burstein | ............... | G06F 17/27 434/353 |
| 2010/0082333 A1* | 4/2010 | Al-Shammari | ...... | G06F 17/2735 704/10 |
| 2011/0177786 A1* | 7/2011 | Marano | ............... | H04B 17/373 455/67.11 |
| 2012/0105613 A1* | 5/2012 | Weng | ............... | G01C 21/3664 348/77 |
| 2013/0036344 A1* | 2/2013 | Ahmed | ............... | G06F 16/9535 715/205 |
| 2013/0297347 A1* | 11/2013 | Cardoza | ............... | G06Q 50/24 705/3 |
| 2014/0279729 A1* | 9/2014 | Delaney | ............... | G06N 99/005 706/12 |
| 2015/0310096 A1* | 10/2015 | Bao | ............... | G06F 17/30734 707/738 |
| 2016/0085742 A1* | 3/2016 | Mahmud | ............... | G06F 17/2775 704/9 |
| 2016/0098485 A1* | 4/2016 | Burke | ............... | G06F 16/221 707/706 |
| 2016/0203221 A1* | 7/2016 | Rao | ............... | G06Q 50/01 707/707 |
| 2016/0203238 A1* | 7/2016 | Cherniavskii | ....... | G06F 16/3322 707/722 |
| 2016/0285897 A1* | 9/2016 | Gantman | ............. | G06N 99/005 |
| 2016/0337390 A1* | 11/2016 | Sridhara | ............... | G06F 3/0484 |
| 2017/0161637 A1* | 6/2017 | Misra | ............... | G06N 99/005 |

\* cited by examiner

FIG. 1C

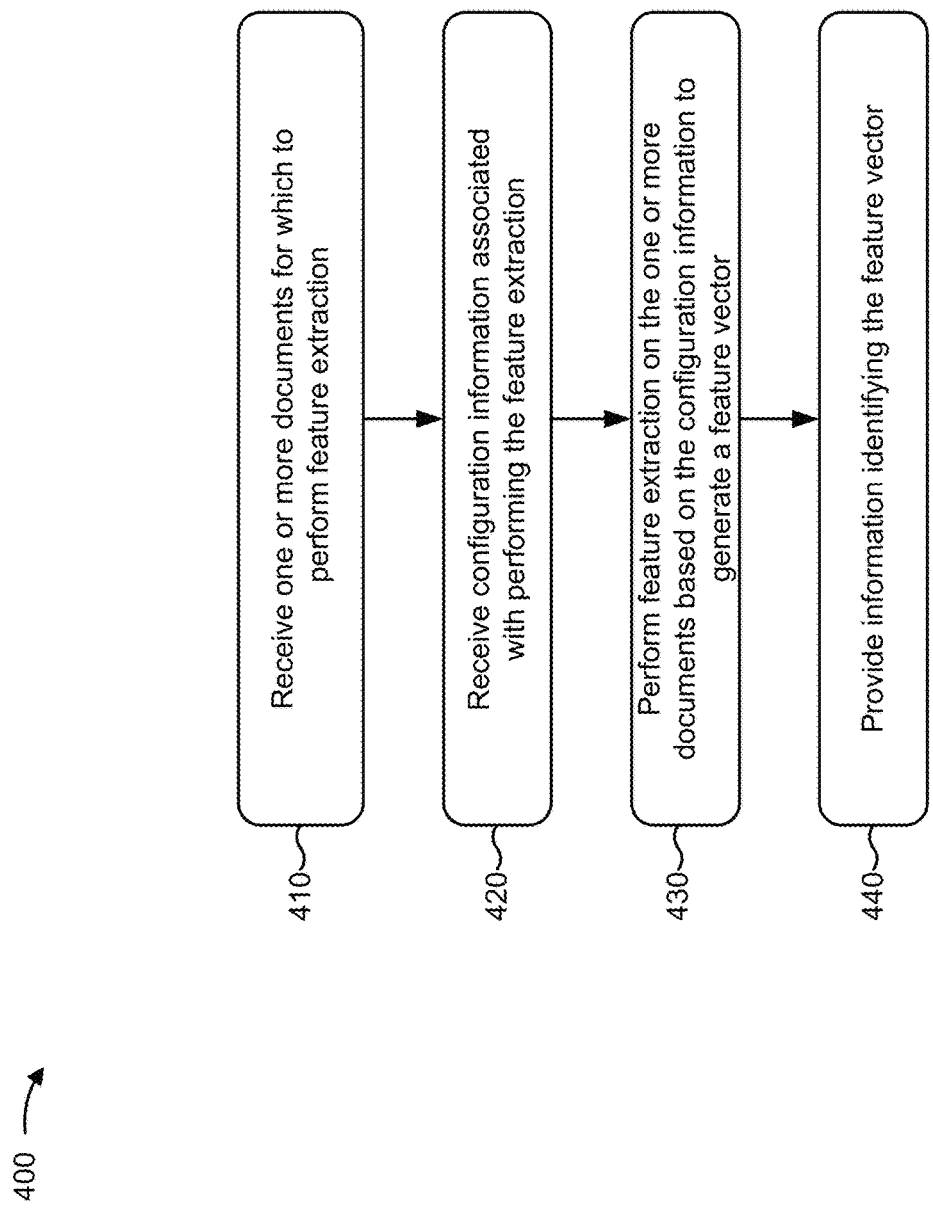

FEATURE EXTRACTION FOR MACHINE LEARNING

RELATED APPLICATION

This application claims priority under 35 U.S.C. § 119 to Indian Patent Application No. 6492/CHE/2015, filed on Dec. 3, 2015, the content of which is incorporated by reference herein in its entirety.

BACKGROUND

A server device may receive a feature vector identifying values representing features of a set of documents. For example, the server device may receive a set of values representing a quantity of words in a sentence, a quantity of sentences in a document, a part of speech of each word in a document, or the like. The server device may utilize a natural language processing technique (e.g., machine learning technique, such as a pattern recognition technique, a data mining technique, a heuristic technique, a supervised learning technique, or the like) to evaluate the set of values and obtain information regarding the set of documents.

SUMMARY

According to some possible implementations, a device may include one or more processors. The one or more processors may receive a first command, included in a set of commands, to set a configuration parameter associated with performing feature extraction. The one or more processors may receive a second command, included in the set of commands, to set a corresponding value for the configuration parameter. The configuration parameter and the corresponding value may correspond to a particular feature metric that is to be extracted. The one or more processors may configure, based on the configuration parameter and the corresponding value, feature extraction for a corpus of documents. The one or more processors may perform, based on configuring feature extraction for the corpus, feature extraction on the corpus to determine the particular feature metric. The one or more processors may generate a feature vector based on performing the feature extraction. The feature vector may include the particular feature metric. The feature vector may include a feature identifier identifying the particular feature metric. The one or more processors may provide the feature vector.

According to some possible implementations, a non-transitory computer-readable medium may store one or more instructions that, when executed by one or more processors, may cause the one or more processors to provide a user interface. The one or more instructions, when executed by the one or more processors, may cause the one or more processors to include one or more user interface elements identifying a set of commands of a feature extraction language. The one or more instructions, when executed by one or more processors, may cause the one or more processors to receive, via the user interface, a selection of one or more commands of the feature extraction language. The one or more commands may identify a set of feature metrics. The one or more instructions, when executed by one or more processors, may cause the one or more processors to perform, based on receiving the selection of the one or more commands of the feature extraction language, feature extraction on a document to determine a set of values for the set of feature metrics. The one or more instructions, when executed by one or more processors, may provide a feature vector to cause a machine learning process to be performed on the document based on the set of values for the set of feature metrics. The feature vector may include the set of values for the set of feature metrics. The feature vector may include information identifying the set of feature metrics.

According to some possible implementations, a method may include determining, by a device, a first one or more feature extraction parameters, of a set of feature extraction parameters, and a first one or more corresponding values for the first one or more feature extraction parameters. The method may include performing, by the device, a first feature extraction on a first document to generate a first one or more feature metrics based on the first one or more feature extraction parameters and the first one or more corresponding values. The method may include providing, by the device and to a first recipient device, a first feature vector including information identifying the first one or more feature metrics. The method may include determining, by the device, a second one or more feature extraction parameters, of the set of feature extraction parameters, and a second one or more corresponding values for the second one or more feature extraction parameters. The method may include performing, by the device, a second feature extraction on a second document to generate a second one or more feature metrics based on the second one or more feature extraction parameters and the second one or more corresponding values. The method may include providing, by the device and to a second recipient device, a second feature vector including information identifying the second one or more feature metrics.

BRIEF DESCRIPTION OF THE DRAWINGS

FIGS. 1A-1C are diagrams of an overview of an example implementation described herein;

FIG. 4 is a flow chart of an example process for generating a feature vector.

DETAILED DESCRIPTION

Figure 1A:
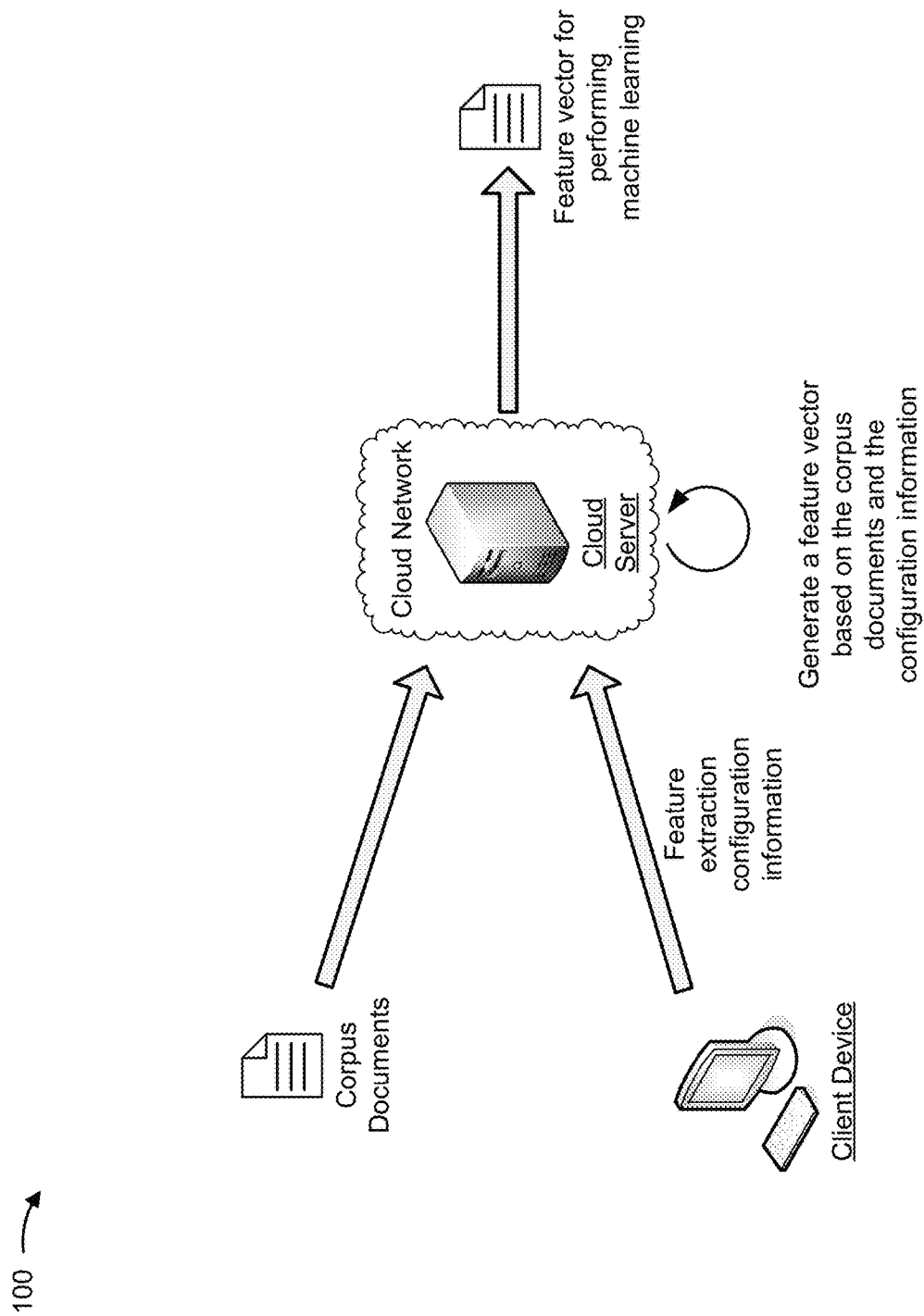

The following detailed description of example implementations refers to the accompanying drawings. The same reference numbers in different drawings may identify the same or similar elements.

A server device (e.g., a cloud server) may receive a feature vector identifying a set of features of a corpus, and may, based on the set of features, perform a machine learning technique for natural language processing. A corpus may refer to a set of documents on which to perform natural language processing, such as a set of legal documents, a set of medical documents, a set of news documents, a set of web documents, or the like. A feature may refer to a measurable property of the corpus, such as a numeric property, a string-based property, a graph-based property, or the like. For example, when a particular document in the corpus includes a set of characters, features of the particular document may include characters of the particular document, groups of characters of the particular documents (e.g., n-grams), categorizations of words of the particular document (e.g., whether a word is capitalized, includes a prefix, is a particular part of speech, etc.), or the like. Based on performing the machine learning technique, the server device may provide information associated with the document, such as a semantic meaning of the document, a classification of the document, a scoring of the document, or the like.

A server device (e.g., another server device, the same server device, etc.) may perform feature extraction on the corpus. Feature extraction may refer to a derivation of a set of feature metrics from one or more features of a document in the corpus. For example, the server device may determine a set of values that represent features of the document, such as a value indicating that a particular word is included in the document, a value identifying a prefix of the particular word, a value indicating that the particular word is capitalized, or the like. The server device may generate a feature vector based on the set of feature metrics (e.g., the set of values), and may provide the feature vector for performing machine learning on the feature vector.

A developer may be assigned to design an application for performing feature extraction for a particular document. However, custom designing applications for performing feature extraction may require that the developer possess specialized knowledge regarding a field associated with the particular document, such as a medical field, a legal field, a web page ranking field, or the like. Moreover, the developer may be required to have specialized knowledge of a machine learning application and associated server device that is intended to utilize a feature vector generated based on performing feature extraction. Furthermore, custom designing applications may be time-consuming, error prone, and resource intensive.

Implementations, described herein, may utilize a feature extraction language to generate a feature vector for different types of documents, machine learning applications, or the like. Moreover, identification information may be included, when transmitting the feature vector, that permits a server device that receives the feature vector to determine what feature a particular value of the feature vector represents. In this way, difficulty in generating feature vectors is reduced relative to custom designing a feature extraction application. Moreover, compatibility between feature extraction and utilization of feature vectors is improved relative to generating feature vectors that do not include identification information. Furthermore, utilization of processing resources and/or utilization of memory resources is reduced relative to designing and performing feature extraction using a custom designed feature extraction application.

Figure 1B:
Figure 1C:
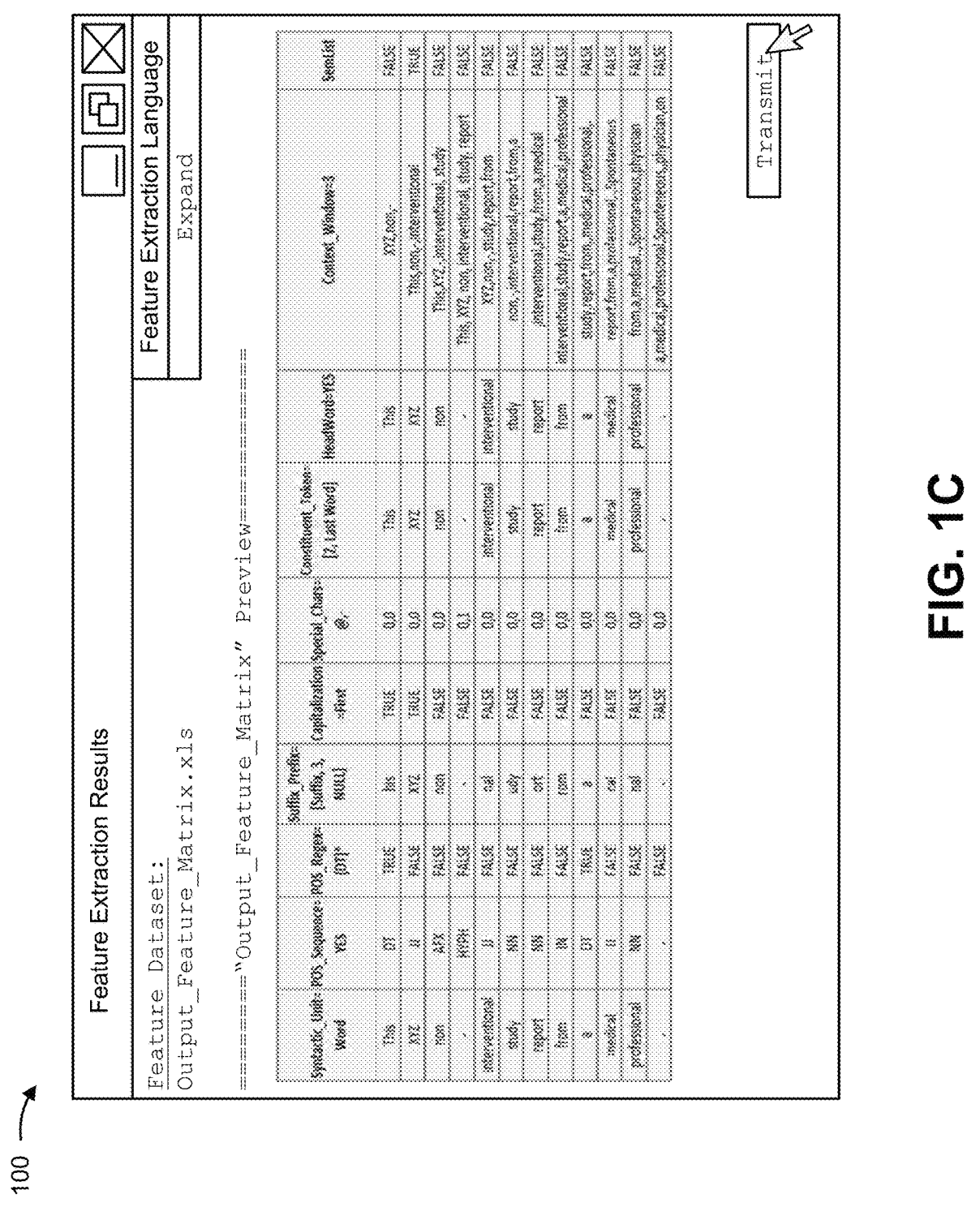

FIGS. 1A-1C are diagrams of an overview of an example implementation 100 described herein. As shown in FIG. 1A, example implementation 100 may include a client device and a cloud network that includes a cloud server. The cloud server may receive a set of documents for performing feature extraction. For example, the cloud server may receive a set of document (e.g., of a corpus of documents) from which to extract features, such as a set of legal documents, a set of medical documents, or the like.

The cloud server may receive feature extraction configuration information. For example, the cloud server may receive a set of configuration parameters relating to performing feature extraction, such as a configuration setting relating to a desired feature metric to obtain or the like. The feature extraction configuration information may be specified via a set of commands (e.g., a feature extraction language), as described in detail with regard to FIG. 1B. For example, the cloud server may provide, via the client device, a user interface with which to receive the set of commands (e.g., a text entry user interface element, a set of menus, or the like). Additionally, or alternatively, the cloud server may determine one or more configuration parameters (e.g., feature extraction parameters) without receiving user input, such as based on stored information, information regarding the corpus, information regarding another cloud server that is to perform machine learning based on results of performing feature extraction, or the like.

The cloud server may perform feature extraction. For example, the cloud server may generate a feature vector based on the corpus documents, the configuration information, or the like. The feature vector may include a set of feature metrics regarding different types of features, such as one or more linguistic types of features (e.g., a syntactic feature, an orthographic feature, a context feature, a dependency feature, a lexical feature, etc.), one or more semantic types of features (e.g., a latent feature, an ontological feature, etc.), one or more statistical types of features (e.g., a distribution feature, a correlation feature, an information specificity feature, a latent semantic association feature, a central themes and topics feature, a clustering feature, etc.), or the like. For example, the cloud server may parse a corpus document to determine whether a word is capitalized, whether the word is within a particular quantity of characters of another word, a quantity of instances of the word in the corpus document, or the like.

The cloud server may provide the feature vector. For example, the cloud server may provide the feature vector to a recipient device, such as the client device, another cloud server, a storage device, or the like for utilization in performing machine learning. In some implementations, the cloud server may include contextual information associated with the feature vector. For example, the cloud server may include information describing a type of feature represented by each entry in the set of feature metrics, thereby permitting a device that receives the set of feature metrics to utilize the feature vector, as described herein with regard to FIG. 1C.

In this way, the cloud server generates a feature vector based on a set of documents. Moreover, based on providing a user interface with which to configure feature extraction and/or providing contextual information with the feature vector, the cloud server permits generation and utilization of the feature vector without developing a custom application associated with the corpus from which the feature vector is generated and/or associated with a machine learning system in which the feature vector is to be utilized.

As shown in FIG. 1B, the cloud server may provide a user interface (e.g., via the user device) to configure feature extraction. For example, the cloud server may generate a user interface with which to receive input associated with configuring feature extraction. The user interface may include information identifying a set of configuration parameters and a set of values corresponding to the set of configuration parameters. For example, the user interface may receive information identifying a first configuration parameter, Corpus_Path, and a corresponding value, "~/Input.txt." In this way, the cloud server may receive information specifying a corpus on which feature extraction is to be performed (e.g., a document identified by the corresponding value). As another example, the user interface may receive information identifying a second configuration parameter, Analysis_Unit, and a corresponding value, "Document." In this way, the cloud server may receive information indicating that feature extraction is to be performed on a per-document basis (e.g., features are to be identified for each document of the corpus, rather than for the entire corpus, for each paragraph of the corpus, for each sentence of the corpus, etc.).

As another example, the user interface may receive information identifying a third configuration parameter, Syntactic_Unit, and a corresponding value, "Word." In this way, the cloud server may receive information indicating that a unit of analysis for identifying features in a document of the corpus is to be each word of the document rather than each phrase, n-gram, each skip n-gram, part of speech, set of parts of speech, regular expression (e.g., a date, a numeric expression, etc.), or the like or the like. As another example, the user interface may receive information identifying a fourth configuration parameter, Suffix_Prefix, and a corresponding value, "[Suffix, 3, NULL]." In this way, the cloud server may receive information indicating that the cloud server is to extract the final 3 characters of a syntactic unit. The NULL value may indicate that the cloud server is to extract the final 3 characters without requiring that the final 3 characters match a particular list of suffixes, a particular regular expression, or the like. As another example, the user interface may receive information identifying a fifth configuration parameter, Capitalization, and a corresponding value, "First." In this way, the cloud server may receive information indicating that the cloud server is to extract a feature metric relating to whether the character of the syntactic unit is capitalized.

As further shown in FIG. 1B, the cloud server may provide information identifying contents of the corpus document selected based on the Corpus_Path configuration parameter. In some implementations, the cloud server may provide information associated with reducing a user difficulty in configuring feature extraction. For example, the cloud server may provide a user interface element, such as a drop-down menu (Available Parameters), a drop-down list, a pop-up window, or the like, that is associated with identifying configuration parameters and/or corresponding values for configuring feature extraction. In some implementations, the cloud server may determine one or more of the configuration parameters without receiving user input. For example, the cloud server may utilize a set of default values for the one or more configuration parameters. Additionally, or alternatively, the cloud server may determine the one or more configuration parameters based on identifying a type of corpus, a type of machine learning technique that is to be applied to the feature vector, or the like. Based on a user interaction with a button (Execute), the cloud server may receive an instruction (e.g., via the user device) to perform feature extraction based on the set of configuration parameters.

As shown in FIG. 1C, the cloud server may provide, via the user device, a user interface including information associated with performing feature extraction. For example, the user interface may include information identifying a feature vector (e.g., a filename, Output_Feature_Matrix.xls). The user interface may provide a preview of results of performing feature extraction. For example, the user interface may display entries of the feature vector. The entries may include a set of header entries identifying a type of feature represented by values corresponding to the entries (e.g., values of the same column as each entry). For example, the cloud server includes, in the feature vector, a first header entry, Syntactic_Unit=Word, corresponding to the first configuration parameter and corresponding value. In this case, the user feature vector includes a first column of entries that are results of performing feature extraction based on the first configuration parameter (e.g., a set of words, This, XYZ, non, -, interventional, study, etc.).

As another example, the feature vector includes a second header entry, Suffix_Prefix=[Suffix, 3, NULL], corresponding to the fourth configuration parameter and corresponding value. In this case, the feature vector includes a second column of entries that are results of performing feature extraction based on the fourth configuration parameter (e.g., a set of 3 character suffixes, his, XYZ, non, -, nal, udy, etc.). As another example, the feature vector includes a third header entry, Capitalization=First, corresponding to the fifth configuration parameter and corresponding value. In this case, the feature vector includes a third column of entries that are results performing feature extraction based on the fifth configuration parameter (e.g., a set of Boolean values representing whether a first letter of a word is capitalized, TRUE, TRUE, FALSE, FALSE, FALSE, FALSE, etc.).

As further shown in FIG. 1C, based on detecting a user interaction with a button, the cloud server may cause the feature vector to be provided for utilization in performing machine learning. Based on transmitting the feature vector, the cloud server may cause a recipient device associated with performing machine learning (e.g., another cloud server) to identify feature values based on corresponding header entries, and utilize the feature values for machine learning. For example, based on the header entry Suffix_Prefix=[Suffix, 3, NULL] indicating that nal is a suffix of interventional, the other cloud server may determine that interventional is an adjective. Similarly, based on the header entry Capitalization=First indicating that the first character of This is capitalized, the other cloud server may determine that This is the first word of a sentence.

In this way, the cloud server generates a feature vector and permits a recipient device (e.g., the same cloud server, another cloud server, or the like) to perform a machine learning technique using the feature vector. Moreover, based on automatically configuring the set of configuration parameters based on stored information, information associated with the set of documents, information associated with the other cloud server, or the like, the cloud server reduces processing and/or memory resources utilized for feature extraction relative to requiring manual generation of a feature extraction application.

Figure 2:
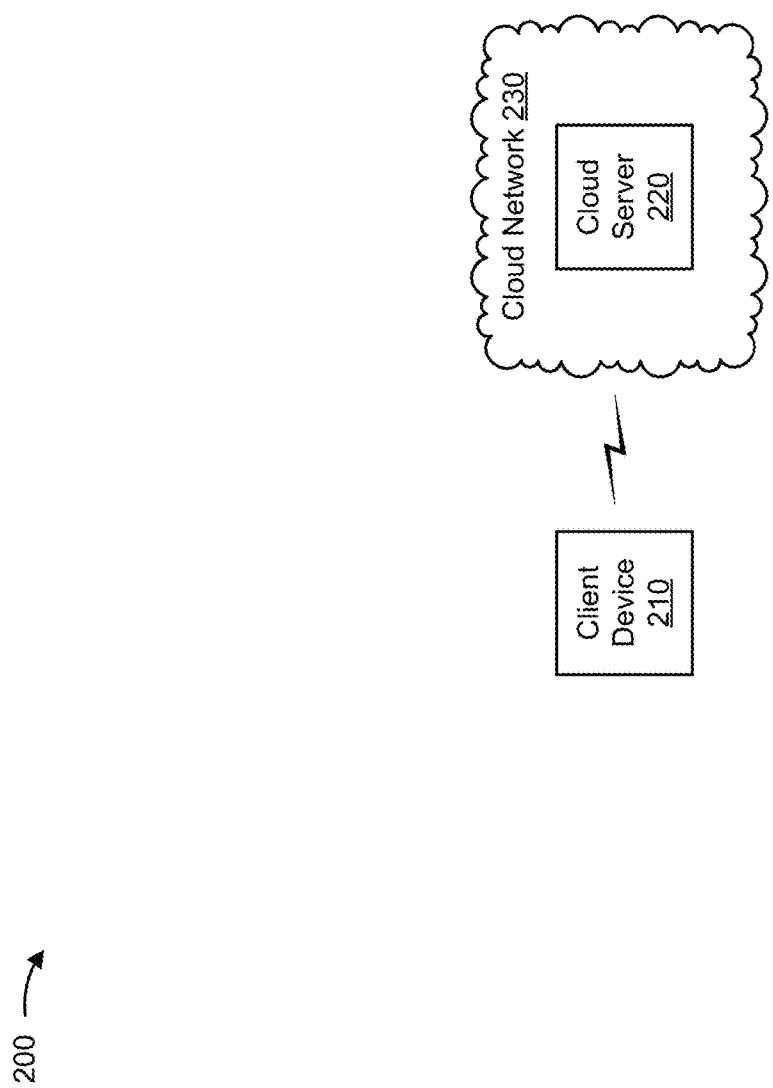
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a cloud server 220, and a cloud network 230. Devices of environment 200 may interconnect via wired connections, wireless connections, or a combination of wired and wireless connections.

Client device 210 may include one or more devices capable of receiving, generating, storing, processing, and/or providing information associated with performing feature extraction. For example, client device 210 may include a communication and/or computing device, such as a mobile phone (e.g., a smart phone, a radiotelephone, etc.), a computer (e.g., a laptop computer, a tablet computer, a handheld computer, a desktop computer, etc.), a wearable communication device (e.g., a smart wristwatch, a pair of smart eyeglasses, etc.), or a similar type of device. In some implementations, client device 210 may provide a user interface with which to input information regarding performing feature extraction. In some implementations, client device 210 may receive information from and/or transmit information to another device in environment 200.

Cloud server 220 may include one or more devices capable of storing, processing, and/or routing information associated with performing feature extraction. For example, cloud server 220 may include a server that performs feature extraction on one or more documents of a corpus and generates a feature vector based on results of performing feature extraction. In some implementations, cloud server 220 may perform machine learning after performing feature extraction. For example, a first cloud server 220 may perform feature extraction on the one or more documents of the corpus to generate a feature vector and a second cloud server 220 may utilize the feature vector to perform a machine learning technique on the one or more documents of the corpus. In some implementations, cloud server 220 may include a communication interface that allows cloud server 220 to receive information from and/or transmit information to other devices in environment 200. While cloud server 220 will be described as a resource in a cloud computing network, such as cloud network 230, cloud server 220 may operate external to a cloud computing network, in some implementations.

Cloud network 230 may include an environment that delivers computing as a service, whereby shared resources, services, etc. may be provided by cloud server 220 to store, process, and/or route information associated with performing feature extraction. Cloud network 230 may provide computation, software, data access, storage, and/or other services that do not require end-user knowledge of a physical location and configuration of a system and/or a device that delivers the services (e.g., cloud server 220). As shown, cloud network 230 may include cloud server 220 and/or may communicate with client device 210 via one or more wired or wireless networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
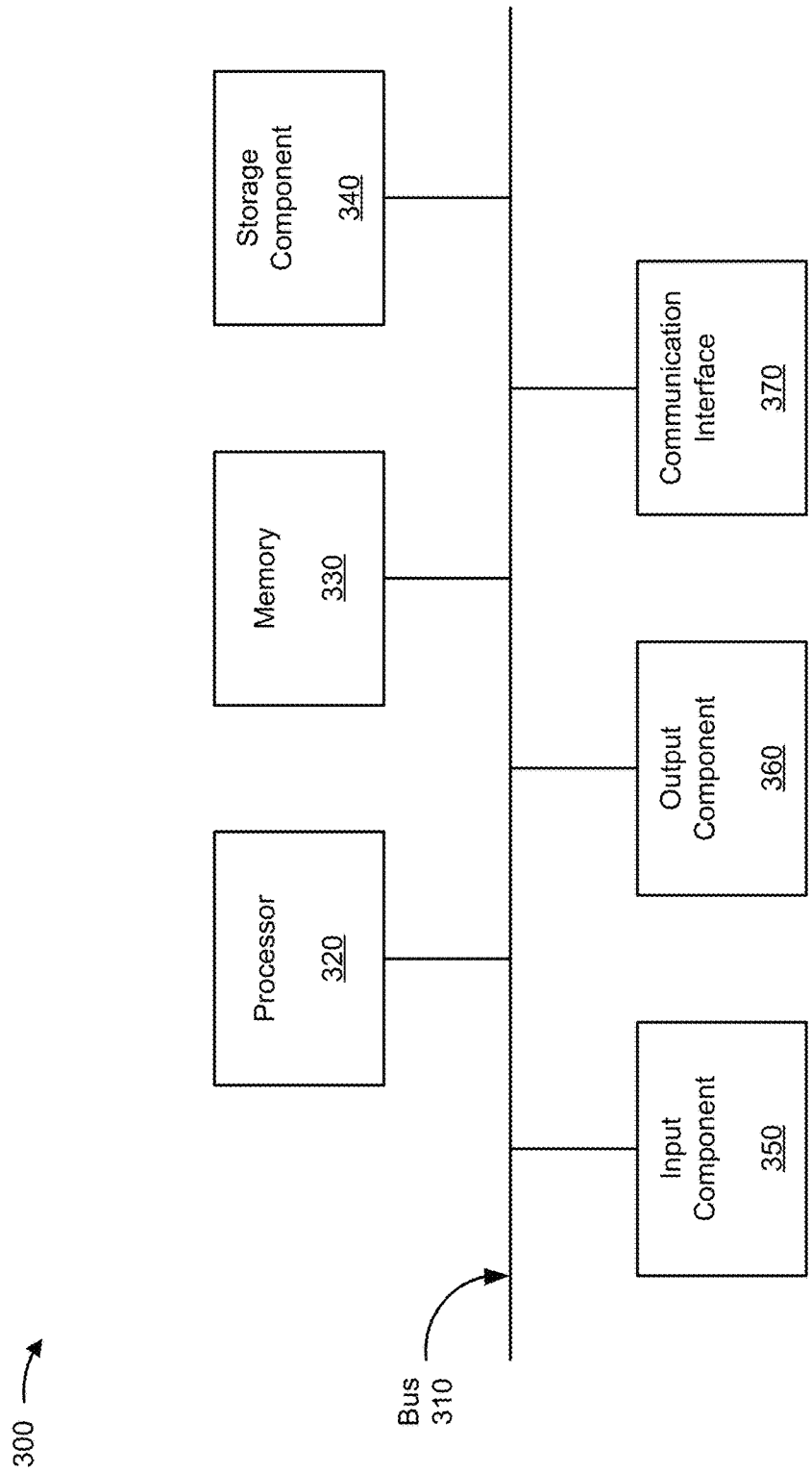
FIG. 3 is a diagram of example components of one or more devices of FIG. 2.

FIG. 3 is a diagram of example components of a device 300. Device 300 may correspond to client device 210 and/or cloud server 220. In some implementations, client device 210 and/or cloud server 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another non-transitory computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for generating a feature vector. In some implementations, one or more process blocks of FIG. 4 may be performed by cloud server 220. In some implementations, one or more process blocks of FIG. 4 may be performed by another device or a group of devices separate from or including cloud server 220, such as client device 210.

As shown in FIG. 4, process 400 may include receiving one or more documents for which to perform feature extraction (block 410). For example, cloud server 220 may receive the one or more documents (e.g., a corpus of documents) for which to perform feature extraction. In some implementations, cloud server 220 may receive information identifying the one or more documents. For example, cloud server 220 may provide a user interface for display (e.g., via client device 210), and may receive, via the user interface, information identifying a location of the one or more documents (e.g., a memory location, a network address, etc.). In this case, cloud server 220 may obtain the one or more documents for which to perform feature extraction.

In some implementations, cloud server 220 may receive the one or more documents from client device 210. For example, client device 210 may transmit a document to cloud server 220 for cloud server 220 to perform feature extraction. Additionally, or alternatively, cloud server 220 may receive the one or more documents from another cloud server 220, another portion of cloud server 220, or the like. For example, a first portion of cloud server 220 (or a first cloud server 220) associated with performing machine learning on the one or more documents may provide the one or more documents to a second portion of cloud server 220 (or a second cloud server 220) to perform feature extraction before performing machine learning.

As further shown in FIG. 4, process 400 may include receiving configuration information associated with performing the feature extraction (block 420). For example, cloud server 220 may receive feature extraction configuration information. In some implementations, cloud server 220 may receive configuration information via a user interface. For example, cloud server 220 may provide (e.g., via client device 210) a user interface with which to receive configuration information. In this case, cloud server 220 may receive the configuration information based on receiving user input via the user interface (e.g., a user selection). Additionally, or alternatively, cloud server 220 may determine the configuration information. For example, cloud server 220 may obtain stored configuration information for performing feature extraction, and may utilize the stored configuration information.

Additionally, or alternatively, cloud server 220 may determine the configuration information based on a type of the one or more documents. For example, cloud server 220 may determine that the one or more documents relate to a particular context, such as a medical text analysis context, a legal text analysis context, a software text analysis context, a sentiment mining context (e.g., opinion mining), a social media text analysis context, a customer intelligence context (e.g., customer data mining), a web page ranking context, a fraud analytics context (e.g., automated fraud detection, electronic spam detection, etc.), or the like. In this case, cloud server 220 may select configuration information associated with performing feature extraction for the particular context (e.g., stored configuration information based on performing feature extraction for one or more other documents relating to the particular context). Additionally, or alternatively, cloud server 220 may determine the configuration information based on a type of machine learning application that is to utilize results of performing feature extraction. For example, cloud server 220 may determine that a particular machine learning application is intended to utilize the results of performing feature extraction, and may obtain stored configuration information associated with providing results that are usable by the particular machine learning application.

In some implementations, cloud server 220 may provide configuration information via the user interface. For example, cloud server 220 may generate a set of configuration parameters associated with configuring feature extraction, and may provide, for display via the user interface, the set of configuration parameters and corresponding values for confirmation by a user. In this way, cloud server 220 may reduce an amount of time required to configure feature extraction relative to a user providing each configuration parameter, thereby reducing processing resource utilization. Additionally, or alternatively, cloud server 220 may provide information associated with reducing a difficulty in a user providing each configuration parameter. For example, cloud server 220 may provide one or more user interface elements to permit a user to select a particular configuration parameter, of a set of configuration parameters, and select a value, of a set of possible corresponding values, for the particular configuration parameter. In this way, a user without specialized knowledge regarding feature extraction can configure feature extraction.

In some implementations, cloud server 220 may provide one or more user interface elements to permit a user to specify a feature extraction logic. For example, cloud server 220 may include a set of stored feature extraction language commands corresponding to the set of configuration parameters, and cloud server 220 may provide a user interface with which to receive input of one or more feature extraction language commands of the set of feature extraction language commands. In this case, cloud server 220 may receive user input of a feature extraction logic via the one or more feature language commands (e.g., a set of logical expressions associated with defining configuration parameters and corresponding values), and may parse the feature extraction language commands to identify a set of configuration parameters and corresponding values and configure feature extraction to be performed based on the set of configuration parameters and corresponding values.

In some implementations, cloud server 220 may provide one or more feature extraction logic examples via a user interface. For example, cloud server 220 may provide an example of a set of feature extraction language commands that correspond to a feature extraction logic, and may provide a plain-language description of a feature metric that is to be extracted based on the set of feature extraction language commands. In this case, cloud server 220 may provide a user interface element to permit the user to select a feature extraction logic example from the one or more feature extraction logic examples, and cloud server 220 may add corresponding feature extraction language commands to a set of commands that are to be parsed to determine configuration parameters and corresponding values for performing feature extraction.

As further shown in FIG. 4, process 400 may include performing feature extraction on the one or more documents based on the configuration information to generate a feature vector (block 430). For example, cloud server 220 may perform feature extraction on the one or more documents based on the configuration information, and may generate the feature vector based on performing feature extraction. In some implementations, cloud server 220 may parse a set of feature extraction language commands to perform the feature extraction. For example, cloud server 220 may parse the set of feature extraction language commands to determine a set of features that are to be extracted. In some implementations, cloud server 220 may parse the set of feature extraction language commands to identify a set of expressions. For example, cloud server 220 may parse a feature extraction language command to identify an expression that, when evaluated based on a syntactic unit of a document, provides an output of a feature metric for a feature identified by the feature extraction language command.

In some implementations, cloud server 220 may utilize a particular unit of analysis to perform feature extraction. For example, when performing feature analysis on a corpus of a set of documents, cloud server 220 may identify statistical features of the corpus (e.g., the set of documents). Similarly, when performing feature analysis on a particular document, cloud server 220 may identify linguistic features or statistical features of the particular document (e.g., of a set of sentences or paragraphs of the particular document). Similarly, when performing feature analysis on a sentence or paragraph, cloud server 220 may identify linguistic features of the sentence or paragraph.

In some implementations, cloud server 220 may determine features for a set of classes of features when performing feature extraction. For example, cloud server 220 may determine a feature that is a linguistic feature (e.g., a syntactic feature, an orthographic feature, a context based feature, a dependency feature, a lexical feature, etc.), a semantic feature (e.g., a latent feature, an ontological feature, etc.), a statistical feature (e.g., a distributional feature, a correlation feature, an information specificity feature, a latent semantic association feature, a central themes and topics feature, a clustering feature, etc.), or the like.

In some implementations, cloud server 220 may generate the feature vector based on performing feature extraction. For example, cloud server 220 may collect feature metrics (e.g., results of performing feature extraction, such as values representing statistical features, semantic features, or the like for the corpus), and may store the feature metrics as the feature vector. Additionally, or alternatively, cloud server 220 may include, in the feature vector, information associated with identifying entries of the feature vector. For example, when cloud server 220 generates a set of columns representing feature values for each syntactic unit that is analyzed by cloud server 220, cloud server 220 may generate a set of header entries identifying a feature represented by each column of the set of columns.

In some implementations, the set of header entries may include feature extraction language commands. For example, cloud server 220 may include a first feature extraction language command representing a configuration parameter (e.g., Syntactic_Unit), a logical operator representing a relationship between the configuration parameter and a corresponding value (e.g., =), and a second feature extraction language command representing the corresponding value (e.g., Word). Similarly, cloud server 220 may include another header entry with a first feature extraction language command, a logical operator, and a second feature extraction language command, such as Suffix_Prefix=[Suffix, 3, NULL], Capitalization=First, or the like. In this case, the feature extraction language command and logical operator may, collectively, be an expression that may be provided as a header entry. Moreover, a recipient device that receives a feature vector may be caused to execute the expression on a training document to determine a meaning of the expression (e.g., the recipient device may execute Capitalization=First on a set of words, determine that capitalized words resolve to TRUE and non-capitalized words resolve to FALSE, and may utilize that determination to determine the meaning of the expression and perform machine learning on the corpus based on the values relating to the expression).

As further shown in FIG. 4, process 400 may include providing information identifying the feature vector (block 440). For example, cloud server 220 may provide information identifying the feature vector. In some implementations, cloud server 220 may provide information identifying one or more feature metrics included in the feature vector. For example, cloud server 220 may provide information identifying a set of values included in the feature vector. In some implementations, cloud server 220 may provide information identifying types of features included in the feature vector. For example, cloud server 220 may provide a set of feature identifiers, such a set of header entries identifying information stored in rows of corresponding columns of a feature vector. In this way, cloud server 220 permits another cloud server 220 that is to perform machine learning based on the feature vector to determine which features are represented by values of the feature vector. Moreover, cloud server 220 may permit multiple different cloud servers 220 (e.g., cloud servers 220 operating multiple different machine learning applications or processes, such as machine learning applications or processes utilizing different input interfaces, machine learning applications or processes associated with different contexts, machine learning applications or processes associated with determining different information, or the like) to utilize the same feature vector, different feature vectors generated by the same cloud server 220, or the like.

Although implementations, described herein, are described in terms of a set of entries with rows and columns, implementations, described herein, may utilize another data structure, such as a list, an array, a matrix, or the like that includes a set of values and information associated with identifying the set of values.

In some implementations, cloud server 220 may provide the information identifying the feature vector to client device 210. For example, cloud server 220 may generate a feature vector document including feature metric values and feature identifiers (e.g., header entries), and may provide the feature vector document to client device 210 for display to a user. Additionally, or alternatively, cloud server 220 may provide the information identifying the feature vector to another cloud server 220 to perform machine learning. For example, a first cloud server 220 may generate the feature vector and provide the feature vector to a second cloud server 220 for storage, and the second cloud server 220 may be caused to utilize the second feature vector to perform machine learning. In this case, the second cloud server 220 may utilize the feature identifiers to correlate feature metric values to an internal logic of a machine learning application, and may perform the machine learning based on the internal logic of the machine learning application.

Additionally, or alternatively, cloud server 220 may provide the information for storage. For example, cloud server 220 may store the feature vector, and may utilize the stored feature vector to perform machine learning on the corpus. In some implementations, cloud server 220 may determine one or more performance metrics associated with performing machine learning on the corpus. For example, cloud server 220 may determine that a set of performance metrics do not satisfy a performance threshold based on a particular quantity of feature metrics failing to reveal underlying information regarding the document. In this case, cloud server 220 may alter one or more configuration parameters to improve performance, and may perform another machine learning process on the document, on one or more other documents, or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
provide a user interface,
the user interface including one or more user interface elements identifying a set of commands of a feature extraction language;
receive, via the user interface, a first command, included in the set of commands, to set a configuration parameter associated with performing feature extraction,
the configuration parameter representing data used to define a manner in which the feature extraction is to be performed for a corpus of documents;
receive, via the user interface, a second command, included in the set of commands, to set a corresponding value for the configuration parameter,
the configuration parameter and the corresponding value corresponding to a particular feature metric that is to be extracted,
the corresponding value specifying a particular type of data to be extracted from the corpus;
configure, based on the configuration parameter and the corresponding value, the feature extraction for the corpus;
perform, based on configuring the feature extraction for the corpus, the feature extraction on the corpus to determine the particular feature metric,
the particular feature metric identifying data extracted from the corpus based on the configuration parameter and the corresponding value;
generate a feature vector based on performing the feature extraction,
the feature vector including the particular feature metric,
the feature vector including a feature identifier identifying the particular feature metric, and
the feature identifier including an expression, the expression including:
data associated with the first command,
data associated with the second command, and
a logical operator identifying a relationship between the first command and the second command; and
provide the feature vector, as input, to a first machine learning application operating on a first recipient device.

2. The device of claim 1, where the corpus is a first corpus, the feature extraction is a first feature extraction, and the feature vector is a first feature vector; and
where one or more processors are further to:
perform a second feature extraction on a second corpus of documents based on one or more commands of the set of commands;
generate a second feature vector based on performing the second feature extraction;
and
provide the second feature vector, as input, to a second machine learning application operating on a second recipient device,
the first machine learning application being different from the second machine learning application.

3. The device of claim 1, where the configuration parameter relates to at least one of:
a linguistic type of feature,
a semantic type of feature, or
a statistical type of feature.

4. The device of claim 1, where the one or more processors are further to:
determine a set of possible corresponding values for the configuration parameter based on receiving the first command,
the set of possible corresponding values including the corresponding value;
provide, via the user interface, information identifying one or more commands, of the set of commands, associated with setting the set of possible corresponding values,
the one or more commands including the second command; and
where the one or more processors, when receiving the second command, are to:
receive a selection of the second command via the user interface based on providing the information identifying the one or more commands.

5. The device of claim 1, where the one or more processors when generating the feature vector are to:
generate a header entry including the feature identifier; and
generate a set of rows associated with the header entry,
the set of rows including a set of values for the particular feature metric,
each value, of the set of values, corresponding to a syntactic unit of a set of syntactic units of the corpus.

6. The device of claim 1, where the one or more processors, when providing the feature vector, are to:
provide the feature vector to cause the first machine learning application to perform a machine learning or natural language processing technique on the corpus based on the particular feature metric,
the first machine learning application being caused to identify the particular feature metric based on the feature identifier.

7. The device of claim 1, where the one or more processors, when providing the feature vector, are to:
provide the feature vector to permit text analytics to be performed on the corpus for at least one of:
a medical text analysis context,
a legal text analysis context,
a software text analysis context,
a sentiment mining context,
a social media text analysis context,
a customer intelligence context,
a web page ranking context, or
a fraud analytics context.

8. The device of claim 1, where the first machine learning application is a text analytics application.

9. A non-transitory computer-readable medium storing instructions, the instructions comprising:
one or more instructions that, when executed by one or more processors, cause the one or more processors to:
provide a user interface,
the user interface including one or more user interface elements identifying a set of commands of a feature extraction language;
receive, via the user interface, a selection of one or more commands of the feature extraction language,
the one or more commands identifying a set of feature metrics,
the one or more commands including a first command to set a configuration parameter associated with the set of feature metrics,
the configuration parameter representing data used to define a manner in which feature extraction is to be performed for a document, and
the one or more commands including a second command to set a corresponding value for the configuration parameter,
the corresponding value specifying a particular type of data to be extracted from the document;
configure, based on the configuration parameter and the corresponding value, the feature extraction;
perform, based on configuring the feature extraction, the feature extraction on the document to determine a set of values for the set of feature metrics,
at least one feature metric, included in the set of feature metrics, identifying a corresponding set of values extracted from the document based on the configuration parameter and the corresponding value;
generate a feature vector based on performing the feature extraction; and
provide the feature vector to cause a machine learning process to be performed on the document based on the set of values for the set of feature metrics,
the feature vector including the set of values for the set of feature metrics, and
the feature vector including information identifying the set of feature metrics,
the information identifying the set of feature metrics including an expression, the expression including:
data associated with the first command,
data associated with the second command, and
a logical operator identifying a relationship between the first command and the second command.

10. The computer-readable medium of claim 9, where the set of feature metrics includes a particular feature metric associated with at least one of:
a syntactic feature,
an orthographic feature,
a context based feature,
a dependency feature,
a lexical feature,
a latent feature,
an ontological feature,
a distribution feature,
a correlation feature,
an information specificity feature,
a latent semantic association feature,
a central themes and topics feature, or
a clustering feature.

11. The computer-readable medium of claim 9, where the one or more user interface elements include at least one of:
a drop-down list,
a drop-down menu, or
a pop-up window.

12. The computer-readable medium of claim 9, where the one or more instructions, when executed by the one or more processors, are further to:
parse the one or more commands to determine a set of expressions for the feature extraction; and
where the one or more instructions, that cause the one or more processors to perform the feature extraction, cause the one or more processors to:
determine the set of values for the set of feature metrics, the set of values being results of evaluating the set of expressions for one or more syntactic units of the document.

13. The computer-readable medium of claim 9, where the one or more instructions, when executed by the one or more processors, cause the one or more processors to:
identify another document,
perform another feature extraction on the other document based on another one or more commands;
generate another feature vector based on performing the other feature extraction; and
provide the other feature vector to cause the machine learning process to be performed on the other document.

14. The computer-readable medium of claim 9, where the machine learning process is a text analytics process.

15. The computer-readable medium of claim 9, wherein the configuration parameter relates to at least one of:
a linguistic type of feature,
a semantic type of feature, or
a statistical type of feature.

16. A method, comprising:
providing, by a device, a user interface,
the user interface including one or more user interface elements identifying a set of commands of a feature extraction language;
receiving, by the device and via the user interface, a first command, included in the set of commands, associated with a set of feature extraction parameters;
receiving, by the device and via the user interface, a second command, included in the set of commands, associated with one or more corresponding values for the set of feature extraction parameters;
determining, by the device and based on the first command and the second command, a first one or more feature extraction parameters, of the set of feature extraction parameters, and a first one or more corresponding values, of the one or more corresponding values, for the first one or more feature extraction parameters,
the first one or more feature extraction parameters representing data used to define a manner in which a first feature extraction is to be performed, and
the first one or more corresponding values specifying, for the first one or more feature extraction parameters, particular types of data to be extracted during the first feature extraction;
configuring, by the device and based on the first one or more feature extraction parameters and the first one or more corresponding values, the first feature extraction for a first document;
performing, by the device and based on configuring the first feature extraction, the first feature extraction on the first document to generate a first one or more feature metrics;
generating, by the device, a first feature vector based on performing the first feature extraction,
the first feature vector including information identifying the first one or more feature metrics,
the information identifying the first one or more feature metrics including an expression, the expression including:
data associated with the first command,
data associated with the second command, and
a logical operator identifying a relationship between the first command and the second command; and
providing, by the device and to a first recipient device, the first feature vector to cause a first machine learning process to be performed on the first document based on the first one or more feature metrics included in the first feature vector.

17. The method of claim 16, further comprising:
determining one or more expressions based on the first one or more feature extraction parameters and the first one or more corresponding values; and
where performing the first feature extraction comprises:
evaluating the one or more expressions to determine the first one or more feature metrics.

18. The method of claim 17, where providing the first feature vector comprises:
providing information identifying the one or more expressions.

19. The method of claim 16, further comprising:
providing the first feature vector to a second recipient device to cause a second machine learning process to be performed on a second document based on the first one or more feature metrics included in the first feature vector,
the second recipient device being different from the first recipient device.

20. The method of claim 16, wherein the set of feature extraction parameters relate to at least one of:
a linguistic type of feature,
a semantic type of feature, or
a statistical type of feature.

* * * * *